Patented July 22, 1941

2,250,186

UNITED STATES PATENT OFFICE 2,250,186

MANUFACTURE OF CEMENT, ALKALI METAL ALUMINATE, AND SULPHUR DIOXIDE

Walter Noll, Cologne-Mulheim, Germany, assignor to I. G. Farbenindustrie Aktiengesellschaft, Frankfort-on-the-Main, Germany No Drawing. Application January 21, 1939, Serial No. 252,119. In Germany February 2, 1938

9 Claims. (Cl. 23—52)

This invention relates to improvements in the manufacture of cement, alkali metal aluminate and sulphur dioxide from materials containing aluminium oxide, calcium sulphate and silicic acid.

When manufacturing alumina from bauxite by decomposition with alkaline reacting compounds there are obtained residues, representing a useful by-product, while when preparing alumina from raw materials containing aluminium oxide and a large amount of silicic acid there are obtained residues, consisting mainly of silicic acid, which are almost valueless. This affects the efficiency of those processes by which alumina is to be manufactured from raw materials rich in silicic acid, the more so since the aluminium silicates generally are poorer in alumina than the bauxites. The problem of efficiency in the manufacture of alumina from raw materials rich in silicic acid is therefore at the same time the important problem of utilizing the residues obtained during the decomposition. These residues can be used in a relatively valuable way by supplying them to cement-works. Thus the residual silicic acid obtained in the decomposition by means of an acid is already used for the manufacture of cement. More suitable are those residues which are obtained by the alkaline decomposition of raw materials containing aluminium oxide and silicic acid, obtained either by means of sodium carbonate and calcium carbonate or by means of calcium carbonate only, since they contain lime apart from the silicic acid. It also has been suggested to sell these residues as lime for fertilizing purposes.

In all these cases the residue is practically valueless, since it can be used in the different industries only as a sort of additional agent. For instance, for the manufacture of cement it must first be dried, analyzed and then mixed with other raw materials and ground to a cement starting mixture.

In accordance with the present invention cement on the one hand and alkali metal aluminate and also sulphur dioxide on the other hand are obtained in a simple way and in only a few working steps from raw materials containing aluminium oxide and silicic acid by mixing a material containing aluminium oxide and silicon dioxide in a proportion of 1 mol of $Al_2O_3$ to about 0.6–6, preferably 1–4, mols of $SiO_2$ with calcium sulphate, whereby the mixture to be calcined is composed in such a proportion that there are present 1.8–2.2 mols of CaO to 1 mol of $Al_2O_3$ and in addition 1.8–2.2 mols of CaO to 1 mol of $SiO_2$, and 4–6% of carbon calculated on the amount of calcium sulphate present, heating the mixture to sintering temperature in a slightly oxidizing atmosphere, lixiviating the calcined product by means of an aqueous solution of an alkali metal salt which yields by double decomposition a difficulty soluble calcium compound, separating the alkali metal aluminate solution obtained from the solid residue, washing the residue with water, heating the washed solid residue to sintering temperature and grinding to cement fineness. In most cases the raw materials contain smaller or larger amounts of iron compounds, especially $Fe_2O_3$. On 1 mol of $SiO_2$ up to about 0.3 mol of $Fe_2O_3$ is to be calculated and 1.8–2.2 mols of CaO for each mol of $Fe_2O_3$.

The working method is more particularly as follows: The raw material or materials are finely ground and mixed with calcium sulphate equally finely ground, for instance with anhydrite or gypsum. The degree of fineness of grinding should be such that the residue left on a 4900 mesh per $cm^2$. sieve is less than 25%. The proportion of the mixture is as follows: 1.8–2.2 mols of CaO to 1 mol of $Al_2O_3$ and in addition 1.8–2.2 mols of CaO to 1 mol of $SiO_2$ and in addition 1.8–2.2 mols of CaO to 1 mol of $Fe_2O_3$ and in addition 1 mol of $Al_2O_3$ to 0.6-6, preferably 1–4, mols of $SiO_2$ and 1 mol of $SiO_2$ to a trace up to 0.3 mol of $Fe_2O_3$, and 3–6% of carbon calculated upon the amount of calcium sulphate present in the mixture are added. If by the combination of the aluminium silicate and the calcium-sulphate such a mixture does not originate, the missing ingredients are to be added, say raw-materials, rich in silicic acid, as for instance quartz sand, flint or raw materials rich in alumina, as for instance bauxite, laterite or raw materials, rich in iron, as for instance limonite, roasted pyrite etc. Thereupon this mixture is sintered in an appropriate apparatus, for instance, a rotary kiln, preferably after having been granulated. The temperatures required for the sintering process are between about 1200 and about 1500° C. and in particular depend upon the composition of the raw materials, especially upon the content of fluxing materials, such as alkalies, iron oxide, magnesium compounds etc. The sintered product obtained tends to spontaneously disintegrate into a fine powder when exposed to the air. In most cases a grinding is superfluous, whereby great expense is saved considering that the calcined material generally is very hard.

The powder, obtained by disintegration of the clinker or if necessary by grinding, is thereupon lixiviated with the solution of an alkali metal salt, the acid residue of which forms together with the calcium of the clinker a difficultly soluble compound, as for instance sodium sulphate or oxalate. Sodium carbonate is preferably used for this purpose. By treatment with this solution a smaller or larger amount of the alumina is dissolved in form of alkali metal aluminate. The amount of the dissolved alumina depends on the amount of alumina contained in the mixture of raw materials and furthermore on the kind of cement which is intended to be manufactured from the residue.

The extraction of the alumina is regulated by sintering the material more or less strongly, which is effected either by regulating the degree of temperature or by regulating its duration, or by working during the lixiviation with different quantities of alkali in excess or with different concentrations. The sintering temperatures vary between about 1200 and about 1500° C., preferably temperatures of 1250–1450° C. are employed, the duration of heating varies between some minutes and some hours. There results when using one and the same raw material when sintering for instance only for 5 minutes at a temperature of 1300° C. a yield of 50% of alumina; when heating at 1300° C. during one hour a yield of more than 80%; when heating at 1400° C. during 10 minutes a yield of 95%. These figures, however, differ according to the nature of the raw material. When lixiviating an increasing content of alkali in comparison with the alumina contained in the clinker involves an increasing of the yield, while an increasing concentration, though involving an increase in the content of alumina in the solution, results in a decrease of the yield. When lixiviating for instance a clinker with a content of 17.5% of $Al_2O_3$ at a temperature of 60° C. with a 3.6 N solution of $Na_2CO_3$ in counter-current and with such an excess of alkali that there is provided 1 mol of $Al_2O_3$ in the clinker for 2 mols of $Na_2O$ a yield of alumina of 83% is obtained. If the same clinker is treated in the same way with the only difference that there are provided only 1.6 mols of $Na_2O$ for 1 mol of $Al_2O_3$, the yield amounts to 70%. If the clinker is lixiviated with such an excess of alkali that there is provided 1.5 mols of $Na_2O$ for 1 mol of $Al_2O_3$, the yield decreases to 62%. The lixiviation temperature lies between 0° C. and 100° C. and influences the process only in so far that when increasing the temperature the leaching is effected in a shorter time. It has proved that the same result is realized when working during 10 minutes at a temperature of 60° C. as when working during 1 hour at 20° C.

The leaching of the clinker is preferably effected in counter-current so as to effect the lixiviation in several steps and to filter each time. The filtration proceeds in an excellent manner in contradistinction to the filtration of those residues, remaining during the alkaline decomposition of bauxite. The clinker is washed with water after having been leached for such a long time that the content of alkali is beneath 1.5%.

Thereupon the residue, containing about 10–20% of water is immediately calcined in a second rotary kiln at a temperature of between about 1300 and 1500° C. The clinker, after having left the kiln, does not tend to disintegrate in contradistinction to the material obtained in the first calcination treatment. It is ground to a cement, if desired while adding material inhibiting the setting, for instance gypsum and calcium chloride.

The aluminate solutions, obtained during the lixiviation of the clinker are worked up in the usual way to alumina, aluminium hydroxide or other aluminiferous products. The methods applied for this purpose differ in no way from those, applied when working up aluminate solutions from bauxite or other sources.

By the above described working method it is possible to obtain the most different cements with a simultaneous obtaining of alkali metal aluminate and sulphur dioxide. The kind of cement intended to be produced, depends on the composition of the raw-mixture as well as on the quantity of alumina dissolved. If a Portland cement is intended to be produced the following proportions are to be chosen: 1.8–2.2 mols of $CaO$ to 1 mol of $SiO_2$ and in addition 1.8–2.2 mols of $CaO$ to 1 mol of $Al_2O_3$ and in addition 1.8–2.2 mols of $CaO$ to one mol of $Fe_2O_3$ and in addition 1–6 mols of $SiO_2$ to 1 mol of $Al_2O_3$ and in addition 1 mol of $SiO_2$ to 0.03–0.1 mol of $Fe_2O_3$, and according to the content of alumina of the clinker there are leached between 40 and 80% of the alumina. From a clinker containing 17% of $Al_2O_3$ 75% of the alumina is extracted, from one containing 13% 70% of the alumina is extracted.

In case an iron cement poor in alumina shall be manufactured, the greater part of the leachable alumina, i. e. up to about 95% of the alumina, is extracted. The iron oxide content in the calcined mixture in this case is about as follows: 0.17–0.1 mol of $Fe_2O_3$ to 1 mol of $SiO_2$.

If a Ferrari cement is intended to be manufactured, the starting mixture is composed in the same way as for the manufacture of Portland cement, but the calcined decomposition mixture is deprived of such an amount of alumina that in the leached and calcined residue the mol proportion of $Al_2O_3$ to $Fe_2O_3$ is equal to 1:1.

Of course, by suitably varying the conditions it is possible to manufacture in this way other kinds of cements.

When working according to the described manner there are obtained cements which as regards their content of $Al_2O_3$, $Fe_2O_3$, $SiO_2$ and $CaO$ meet standard requirements. Of course, the cements may also contain other components, as for instance $MgO$, $TiO_2$, $SO_3$, and alkalies, all in quantities which must comply with the standard.

Since the residue brought into the kiln consists of components already finely divided and disintegrated to a far reaching extent, it is far easier to manufacture a highly valuable cement from such a residue than from a mixture of raw materials such as lime, marl and clay. In contradistinction to all processes of obtaining alumina from aluminium silicates known up to date, the process in question involves the advantage of an absolute utilization of the whole material put in without any waste and that the large ballast of silicic acid is obtained directly in a relatively valuable form, i. e. as cement. This not only saves a number of operations which would have been unavoidable when supplying the residue as an additional agent to the cement-works but at the same time increases the efficiency of a process of manufacturing alumina combined with the manufacture of cement.

In contradistinction to the processes of obtaining alumina from aluminium silicates by means of an acid, the process in question involves the advantage of making it possible to work up various raw materials, while when working according to the acid process the working up is restricted to clays rich in kaolin. According to my invention also slate clays, ashes, slags rich in alumina can be worked up. It is of special advantage to use raw materials containing alkali, since the loss of alkali, arising when washing out the clinker, can be compensated entirely or partly by the content of alkali in the raw material.

In this way it is possible to simultaneously prepare three products namely sulphur dioxide, cement and aluminate by means of one and the same process, while up to the present time only a process of simultaneously preparing sulphur dioxide and cement was known. When preparing alkali metal aluminate in accordance with the new process only a second kiln and a leaching apparatus are required in addition to the apparatus needed for the known process.

*Example*

100 parts by weight of a clay composed as follows: 45.1% of $SiO_2$, 37.5% of $Al_2O_3$, 1.5% of $Fe_2O_3$ and 14.6% loss on ignition are mixed with 300 parts of anhydrite, 4.2 parts of iron oxide (in the form of roasted pyrites) and 16.5 parts of coke. All the raw materials are subjected to such a fine grinding that the residue remaining on a sieve of 4900 mesh per $cm.^2$ is between 5 and 10%.

The mixture is formed to granules and calcined in a rotary kiln up to 1350° C. in a slightly oxidizing atmosphere, whereby the material is kept during 10 minutes at a temperature of 1350° C. When leaving the kiln the clinker shows the following composition: 20.8% of $SiO_2$, 17.2% of $Al_2O_3$, 2.6% of $Fe_2O_3$, 58.0% of $CaO$, 0.7% of $SO_3$. On air-cooling it disintegrates spontaneously into dust-like powder. This powder is leached in counter-current with a 3.6 normal sodium carbonate solution at 60° C. The quantity of the solution is calculated in such a way that 1 mol of $Al_2O_3$ in the clinker corresponds to 1.6 mol of $Na_2O$ in the solution. Such a further amount of solution is added as corresponds to that retained by the filter cake when filtering off, i. e. for 100 grams of clinker about 100 ccms. of the solution. Under these circumstances 75% of the alumina of the clinker are dissolved. The aluminate solution is worked up in the usual manner. The residue is washed with water and calcined in a second rotary kiln at temperatures between about 1350 and about 1450° C. A cement clinker of the following composition is formed: 23.6% of $SiO_2$, 4.9% of $Al_2O_3$, 3.0% of $Fe_2O_3$, 66.0% of $CaO$, 0.8% of alkali, which with the addition of 3% of gypsum is ground to the fineness of cement. The Portland cement obtained was examined according to the standard and showed a compressive strength and tensile strength being much higher than those of the standard.

I claim:

1. Process of preparing cement, alkali metal aluminate and sulphur dioxide which comprises mixing a material containing aluminium oxide and silicon dioxide in a proportion of 1 mol of $Al_2O_3$ to about 0.6 to 6 mols of $SiO_2$ with calcium sulphate whereby the mixture to be calcined is composed in such a proportion that there are present 1.8–2.2 mols of $CaO$ to 1 mol of $Al_2O_3$ and in addition 1.8–2.2 mols of $CaO$ to 1 mol of $SiO_2$, and carbon in an amount of about 4 to about 6% calculated on the amount of calcium sulphate present, heating the finely divided mixture to sintering temperature, to drive off the $SO_2$, lixiviating the calcined product by means of an aqueous solution of an alkali metal salt which yields by double decomposition a difficultly soluble calcium compound, separating the alkali metal aluminate solution obtained from the solid residue, washing the residue by means of water, heating the washed solid residue to sintering temperature, and grinding the resulting product to produce a cement.

2. Process of preparing cement, alkali metal aluminate and sulfur dioxide which comprises mixing a material containing aluminium oxide, silicon dioxide and iron oxide in a proportion of 1 mol of $Al_2O_3$ to about 0.6 to 6 mols of $SiO_2$, a trace to about 0.3 mol of $Fe_2O_3$ to 1 mol of $SiO_2$ with calcium sulphate whereby the mixture to be calcined is composed in such a proportion that there are present 1.8–2.2 mols of $CaO$ to 1 mol of $Al_2O_3$ and in addition 1.8 to 2.2 mols of $CaO$ to 1 mol of $SiO_2$ and in addition 1.8 to 2.2 mols of $CaO$ to 1 mol of $Fe_2O_3$ and carbon in an amount of about 4 to about 6% calculated on the amount of calcium sulphate present, heating the finely divided mixture to sintering temperature to drive off the $SO_2$, lixiviating the calcined product by means of an aqueous solution of an alkali metal salt which yields by double decomposition a difficultly soluble calcium compound, separating the alkali metal aluminate solution obtained from the solid residue, washing the residue by means of water, heating the washed solid residue to sintering temperature, and grinding the resulting product to produce a cement.

3. Process of preparing cement, alkali metal aluminate and sulphur dioxide which comprises mixing a material containing aluminium oxide and silicon dioxide in a proportion of 1 mol of $Al_2O_3$ to about 0.6 to 6 mols of $SiO_2$ with calcium sulphate whereby the mixture to be calcined is composed in such a proportion that there are present 1.8–2.2 mols of $CaO$ to 1 mol of $Al_2O_3$ and in addition 1.8–2.2 mols of $CaO$ to 1 mol of $SiO_2$ and carbon in an amount of about 4 to about 6% calculated on the amount of calcium sulphate present, heating the finely divided mixture to sintering temperature to drive off the $SO_2$, lixiviating the calcined product by means of an aqueous solution of an alkali metal salt which yields by double decomposition a difficultly soluble calcium compound, said solution containing at least one mol of alkali metal compound on one mol of aluminium oxide in the sintered product and which solution has a concentration of about 1–4 times of normal alkali, transforming thereby about 40–95% of the alumina present into aluminate, separating the alkali metal aluminate solution obtained from the solid residue, washing the residue by means of water, heating the washed solid residue to sintering temperature, and grinding the resulting product to produce a cement.

4. Process of preparing cement, alkali metal aluminate and sulphur dioxide, which comprises mixing a material containing aluminium oxide, silicon dioxide and iron oxide in a proportion of 1 mol of $Al_2O_3$ to about 0.6 to 6 mols of $SiO_2$, a trace to about 0.3 mol of $Fe_2O_3$ to 1 mol of $SiO_2$ with calcium sulphate whereby the mixture to be calcined is composed in such a proportion that there are present 1.8–2.2 mols of $CaO$ to 1 mol of $Al_2O_3$ and in addition 1.8 to 2.2 mols of $CaO$ to 1 mol of $SiO_2$ and in addition 1.8 to 2.2 mols of $CaO$ to 1 mol of $Fe_2O_3$ and carbon in an amount of about 4 to about 6% calculated on the amount of calcium sulphate present, heating the finely divided mixture to sintering temperature to drive off the $SO_2$, lixiviating the calcined product by means of an aqueous solution of an alkali metal salt which yields by double decomposition a difficultly soluble calcium compound, said solution containing at least one mol of alkali metal compound on one mol of aluminium oxide in the sintered product and which solution has a concentration of about 1–4 times of normal alkali, transforming thereby about 40–95% of the alumina present into aluminate, separating the alkali metal aluminate solution obtained from the solid residue, washing the residue by means of water, heating the washed solid residue to sintering temperature, and grinding the resulting product to produce a cement.

5. Process of preparing cement, alkali metal aluminate and sulphur dioxide which comprises mixing a material containing aluminium oxide and silicon dioxide in a proportion of 1 mol of $Al_2O_3$ to about 0.6 to 6 mols of $SiO_2$ with calcium sulphate whereby the mixture to be calcined is composed in such a proportion that there are present 1.8–2.2 mols of CaO to 1 mol of $Al_2O_3$ and in addition 1.8–2.2 mols of CaO to 1 mol of $SiO_2$ and carbon in an amount of about 4 to about 6% calculated on the amount of calcium sulphate present, heating the finely divided mixture to a temperature of 1250–1450° C. to drive off the $SO_2$, lixiviating the calcined product by means of an aqueous solution of an alkali metal salt which yields by double decomposition a difficultly soluble calcium compound, separating the alkali metal aluminate solution obtained from the solid residue, washing the residue by means of water, heating the washed solid residue to a temperature of 1300–1500° C., and grinding the resulting product to produce a cement.

6. Process of preparing cement, alkali metal aluminate and sulphur dioxide which comprises mixing a material containing aluminium oxide, silicon dioxide and iron oxide in a proportion of 1 mol of $Al_2O_3$ to about 0.6–6 mols of $SiO_2$, a trace to about 0.3 mol of $Fe_2O_3$ to 1 mol of $SiO_2$ with calcium sulphate whereby the mixture to be calcined is composed in such a proportion that there are present 1.8–2.2 mols of CaO to 1 mol of $Al_2O_3$ and in addition 1.8 to 2.2 mols of CaO to 1 mol of $SiO_2$ and in addition 1.8 to 2.2 mols of CaO to 1 mol of $Fe_2O_3$ and carbon in an amount of about 4 to about 6% calculated on the amount of calcium sulphate present, heating the finely divided mixture to a temperature of 1250–1450° C. to drive off the $SO_2$, lixiviating the calcined product by means of an aqueous solution of an alkali metal salt which yields by double decomposition a difficultly soluble calcium compound, separating the alkali metal aluminate solution obtained from the solid residue, washing the residue by means of water, heating the washed solid residue to a temperature of 1300–1500° C., and grinding the resulting product to produce a cement.

7. Process of preparing cement, alkali metal aluminate and sulphur dioxide which comprises mixing a material containing aluminium oxide and silicon dioxide in a proportion of 1 mol of $Al_2O_3$ to about 0.6 to 6 mols of $SiO_2$ with calcium sulphate whereby the mixture to be calcined is composed in such a proportion that there are present 1.8–2.2 mols of CaO to 1 mol of $Al_2O_3$ and in addition 1.8–2.2 mols of CaO to 1 mol of $SiO_2$ and carbon in an amount of about 4 to about 6% calculated on the amount of calcium sulphate present, heating the finely divided mixture to a temperature of 1250–1450° C. to drive off the $SO_2$, lixiviating the calcined product by means of an aqueous solution of an alkali metal salt which yields by double decomposition a difficultly soluble calcium compound, said solution containing at least one mol of alkali metal compound on one mol of aluminium oxide in the sintered product and which solution has a concentration of about 1–4 times of normal alkali, transforming thereby about 40–95% of the alumina present into aluminate, separating the alkali metal aluminate solution obtained from the solid residue, washing the residue by means of water, heating the washed solid residue to a temperature of 1300–1500° C., and grinding the resulting product to produce a cement.

8. Process of preparing cement, alkali metal aluminate and sulphur dioxide which comprises mixing a material containing aluminium oxide, silicon dioxide and iron oxide in a proportion of 1 mol of $Al_2O_3$ to about 0.6 to 6 mols of $SiO_2$, a trace to about 0.3 mol of $Fe_2O_3$ to 1 mol of $SiO_2$ with calcium sulphate whereby the mixture to be calcined is composed in such a proportion that there are present 1.8–2.2 mols of CaO to 1 mol of $Al_2O_3$ and in addition 1.8 to 2.2 mols of CaO to 1 mol of $SiO_2$ and in addition 1.8 to 2.2 mols of CaO to 1 mol of $Fe_2O_3$ and carbon in an amount of about 4 to about 6% calculated on the amount of calcium sulphate present, heating the finely divided mixture to a temperature of 1250–1450° C. to drive off the $SO_2$, lixiviating the calcined product by means of an aqueous solution of an alkali metal salt which yields by double decomposition a difficultly soluble calcium compound, said solution containing at least one mol of alkali metal compound on one mol of aluminium oxide in the sintered product, and which solution has a concentration of about 1–4 times of normal alkali, transforming thereby about 40–95% of the alumina present into aluminate, separating the alkali metal aluminate solution obtained from the solid residue, washing the residue by means of water, heating the washed solid residue to a temperature of 1300–1500° C., and grinding the resulting product to produce a cement.

9. Process of preparing Portland cement, alkali metal aluminate and sulphur dioxide which comprises mixing a material containing aluminium oxide, silicon dioxide and iron oxide in a proportion of 1 mol of $Al_2O_3$ to about 2 mols of $SiO_2$, 0.03–0.1 mol of $Fe_2O_3$ to 1 mol of $SiO_2$ with calcium sulphate whereby the mixture to be calcined is composed in such a proportion that there are present 2 mols of CaO to 1 mol of $Al_2O_3$ and in addition 2 mols of CaO to 1 mol of $SiO_2$ and in addition 2 mols of CaO to 1 mol of $Fe_2O_3$ and carbon in an amount of about 5.5% calculated on the amount of calcium sulphate present, heating the finely divided mixture to a temperature of 1250–1450° C. in a slightly oxidizing atmosphere to drive off the $SO_2$, lixiviating the calcined product by means of an aqueous solution of an alkali metal salt which yields by double decomposition a difficultly soluble calcium compound, said solution containing at least one mol of alkali metal compound on one mol of aluminium oxide in the sintered product, and which solution has a concentration of about 1–4 times of normal alkali, transforming thereby about 70–80% of the alumina present into aluminate, separating the alkali metal aluminate solution obtained from the solid residue, washing the residue by means of water, heating the washed solid residue to a temperature of 1300–1500° C., and grinding the resulting product to produce a cement.

WALTER NOLL.